Patented May 9, 1933

1,908,500

UNITED STATES PATENT OFFICE

DAVID R. WIGGAM, OF KENVIL, NEW JERSEY, ASSIGNOR TO HERCULES POWDER COMPANY, OF WILMINGTON, DELAWARE, A CORPORATION OF DELAWARE

METHOD OF PURIFYING NITRATED CELLULOSE

No Drawing.     Application filed February 12, 1929. Serial No. 339,496.

My invention relates to a method for purifying nitrated nitrocellulose, such as nitrated wood, nitrated cotton, etc.

Heretofore nitrated cellulose, as for example, nitrated cotton, has been customarily purified by first centrifuging to remove the nitrating acids as far as possible, and then removing the remaining acids by drowning in cold water and giving acid hydrolysis, by a series of hot water boils in a .5% nitric acid solution followed by a series of cold water washes. After the washing the nitrated cellulose is introduced into an autoclave, or digester, with about ten times its quantity of fresh water and heated with live steam under a pressure of about 30-40 pounds for about ten hours. The cellulose, on removal from the digester, is desirably bleached, as with a suitable concentration of chlorine and finally the water is removed, as by treatment with alcohol, rendering the material ready for sale.

The purification of nitrated cellulose as heretofore effected has been an expensive and time consuming operation requiring substantial investment in connection with apparatus and substantially lengthening the time required for the production of the finished nitrated cellulose.

Now, in accordance with my invention I provide a method for the purification of nitrated cellulose by which nitrated cellulose of any degree of nitration may be purified to the desired stability with large saving of time and at a minimum of expense, especially on account of apparatus.

The method in accordance with my invention involves the treatment of nitrated cellulose, from which excess nitrating acid has been removed by centrifugation and which has been boiled in water sufficiently long to eliminate from it the majority of free acid, with a treating liquid of high boiling point and which is capable of wetting the nitrated cellulose. The treatment is effected with the treating liquid in aqueous solution, desirably slightly acidulated, and at an elevated temperature and it is believed has the effect of preferentially splitting off from the nitrated cellulose the sulphuric ester of cellulose which contaminates it, the acid acting as a catalyst.

In carrying the method according to my invention into practice, I may use as the treating liquid, for example, an alcohol of higher boiling point than that of ethyl alcohol as glycerine, a glycol, such as ethylene glycol, diethylene glycol and the like, terpineol-ethyl alcohol mixture, etc. The treating liquid is used in aqueous solution, for example, with from about 50% to about 95% water, depending upon the temperature at which the treatment is to be carried out. As has been indicated, the solution is desirably acidulated, for example, to a pH value of 3.0, or within about the range pH 1.0-pH 7.0, with, for example, sulphuric acid, oxalic acid, phosphoric acid, or the like.

In carrying out the treatment the nitrated cellulose, as nitrated wood, nitrated cotton, etc. and an ionizing liquid in acidulated aqueous solution is subjected to a temperature within about the range 120° C.–140° C. depending upon the degree of nitration of the cellulose, for a period ranging from 3 minutes to 3 hours, depending upon the degree of purification and stability desired. After the treatment the nitrated cellulose is freed from the solution, washed with water and boiled in water or dilute alkali solution for about an hour to remove the last traces of the treating liquid.

As a more specific illustration of the practical adaptation of my invention, a quantity of trinitrocellulose, as, for example, trinitrocotton, is centrifuged and boiled in water long enough to remove from it the majority of free acid. The moisture content of the nitrated cotton is then reduced to 20%–30%, by centrifuging and the cotton heated to about 140° C. in a suitable vessel with 5–10 times its quantity of a solution of glycerin 90–95% in 5–10% of water, acidulated with sulphuric acid so as to have a pH value of about 3.0. The heating is continued for about three hours, after which the solution is removed from the cotton and the cotton is washed with water and boiled with a dilute solution of, for example, sodium hydroxide to remove all trace of the acid. The cotton will be found to be purified and stabilized to a degree comparable to that obtained by the more lengthy processes heretofore used.

In carrying out the method in accordance with my invention, it will be appreciated that the temperature used will be lower for low degrees of nitration and higher for high degrees of nitration and that the treating liquid solution will be of a strength adapted to boil at just above the temperature of treatment, thus enabling control of the temperature. It will be further appreciated that where maximum stability is desired to treatment will be prolonged.

In carrying out the method in accordance with my invention higher temperatures than those specified may be used and the time of treatment shortened, but higher temperatures will have the effect of causing the cotton to have a yellow color.

It will be understood that the method in accordance with my invention may be carried out continuously as well as in batches and that the treating liquid solution may be reused; and it will be further understood that the method in accordance with my invention is applicable to the treatment of nitrated cellulose generally including nitrated wood, nitrated cotton, etc.

Having now fully described my invention, what I claim and desire to protect by Letters Patent is:

1. The method of purifying nitrated cellulose which includes heating nitrated cellulose with glycerin in acidulated aqueous solution.

2. The method of purifying nitrated cotton which includes subjecting nitrated cotton to treatment with glycerin in acidulated aqueous solution.

3. The method of purifying nitrated cotton which includes heating nitrated cotton with glycerin in acidulated aqueous solution.

4. The method of purifying nitrated cotton which includes subjecting nitrated cotton to treatment with glycerin in acidulated aqueous solution at a temperature within about the range 120° C.–140° C.

5. The method of purifying nitrated cotton which includes removing excess acid from nitrated cotton, boiling the nitrated cotton in water, reducing the moisture content of the cotton to about 20%–30% and subjecting the cotton to treatment with glycerin in aqueous solution acidulated with sulphuric acid and at a temperature within about the range 120° C.–140° C.

6. The method of purifying nitrated cellulose, which includes heating nitrated cellulose with an alcohol having a boiling point higher than that of ethyl alcohol.

7. The method of purifying nitrated cellulose, which includes heating nitrated cellulose with an alcohol having a boiling point higher than that of ethyl alcohol in aqueous solution and freeing the nitrated cellulose from the alcohol.

8. The method of purifying nitrated cellulose, which includes heating nitrated cellulose at a temperature within about the range 120–140° C. with an alcohol having a boiling point higher than that of ethyl alcohol and freeing the nitrated cellulose from the alcohol.

9. The method of purifying nitrated cellulose, which includes heating nitrated cellulose with an alcohol having a boiling point higher than that of ethyl alcohol in acidulated aqueous solution.

10. The method of purifying nitrated cellulose, which includes heating nitrated cellulose at a temperature within about the range 120–140° C. with an alcohol having a boiling point higher than that of ethyl alcohol in acidulated aqueous solution and freeing the nitrated cellulose from the alcohol.

11. The method of purifying nitrated cellulose, which includes heating nitrated cellulose with glycerin.

12. The method of purifying nitrated cellulose, which includes heating nitrated cellulose with a glycol.

13. The method of purifying nitrated cellulose, which includes heating nitrated cellulose with a glycol in acidulated aqueous solution.

In testimony of which invention, I have hereunto set my hand, at Kenvil, N. J., on this 5th day of February, 1929.

DAVID R. WIGGAM.